No. 708,170. Patented Sept. 2, 1902.
H. G. REIST.
LUBRICATING DEVICE.
(Application filed Jan. 23, 1901.)
(No Model.)
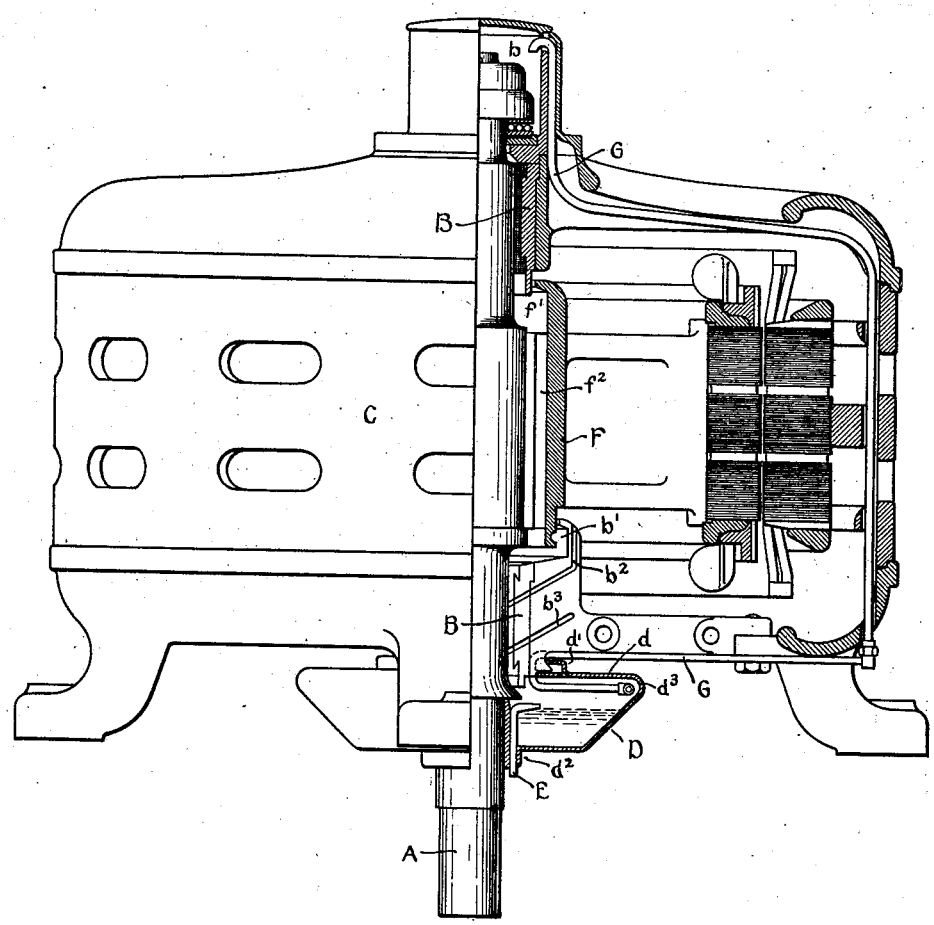
Witnesses.
John Ellis Glenn.
Benjamin B Hull.
Inventor.
Henry G. Reist.
by Albert G. Davis
Atty.

UNITED STATES PATENT OFFICE.

HENRY G. REIST, OF SCHENECTADY, NEW YORK, ASSIGNOR TO GENERAL ELECTRIC COMPANY, A CORPORATION OF NEW YORK.

LUBRICATING DEVICE.

SPECIFICATION forming part of Letters Patent No. 708,170, dated September 2, 1902.

Application filed January 23, 1901. Serial No. 44,399. (No model.)

*To all whom it may concern:*

Be it known that I, HENRY G. REIST, a citizen of the United States, residing at Schenectady, county of Schenectady, State of New York, have invented certain new and useful Improvements in Lubricating Devices, (Case No. 1,385,) of which the following is a specification.

My invention relates to lubricating devices for machines having upright shafts, and is particularly adapted for dynamo-electric machines in which the axis of rotation is vertical. In such machines as now constructed the lower bearing is inaccessible; and it is the object of my invention to provide a lubricating system so arranged that the oil for both bearings may be supplied through an oil-cup at the top of the machine and may be caused by the motion of the machine itself to circulate through both or all of the bearings. I accomplish this result by providing the rotating member with a passage or duct between the upper and lower bearings, so that oil supplied to the oil-cup at the top of the machine may pass to the bearing at the bottom, a drip cup or cups being provided for catching the oil as it comes from the bearings. In order that the oil may be caused to circulate by the motion of the machine itself, I so shape the drip-cup that it constitutes a centrifugally-operated oiling device, and I provide a system of piping connected at one end to the bearing to be lubricated and having its other end arranged to be supplied with oil from the centrifugally-operated device.

My invention will be better understood by reference to the following description, taken in connection with the accompanying drawing, while its scope will be pointed out in the appended claim.

The drawing shows a half-sectional elevation of dynamo-electric machine embodying my invention.

The upright rotatable shaft A is journaled in bearings B, secured to the stationary frame C of the machine. An annular drip-cup D, so shaped as to constitute a centrifugally operated oiling device is secured to the shaft below the lower bearings B. This cup has an inwardly-turned rim $d$ to prevent the oil from being thrown out by the centrifugal force due to the rapid rotation of the shaft. The inner edge of the rim is preferably close to the lower end of the bearing, and as an additional precaution an upright flange $d'$ may be secured to the rim near the bearing. In the hub $d^2$ of the drip-cup, which fits oil-tight on the shaft A, is an upright overflow-pipe E, whose upper end stands high enough below the bottom of the cup to insure the retention in the cup of a considerable body of oil. Any excess of oil escapes through the overflow-pipe and may be led away to any desired point.

Dipping into the cup D is a transfer-pipe G, whose open lower end lies near the side of the cup. The upper end of the pipe terminates above the upper bearing B, the oil being thus transferred from the cup below the lower bearing to the upper end of the upper bearing. Each bearing preferably has a cup $b$ $b'$, into which the oil is delivered. The transfer-pipe G is carried outwardly and up through the frame of the machine in order to avoid the rotating element of the machine. This long circuit also tends to cool the oil. The cup D has outwardly-flaring sides, so that when the machine is in operation the oil will be thrown outwardly and upwardly to the corner $d^3$, where the receiving end of the transfer-pipe G is located normally above the surface of the oil. The drip from the upper bearing runs into an annular cup $f'$ on the hub of the rotating element, whence it passes by a passage $f^2$ through said hub to the cup $b'$ at the upper end of the lower bearing. Any oil escaping over the inturned rim of this cup $b'$ is caught in a groove $b^2$, which runs diagonally inward and downward in one of the meeting surfaces of the bearing until it reaches the journal. Another similarly-inclined groove $b^3$ in said bearing assists in arresting and returning any oil which may work outwardly between the meeting surfaces of the bearings.

By employing the rotating cup D and the stationary transfer-pipe G the same supply of oil is automatically fed again and again to the bearings, keeping the brasses well lubricated, preventing waste of lubricant, and avoiding the accumulation of oil and dirt on the shaft below the bearings.

What I claim as new, and desire to secure by Letters Patent of the United States, is—

In a dynamo-electric machine, the combination, with the rotatable member thereof mounted on an upright shaft, of upper and lower bearings for said shaft, there being a passage or duct in said member joining said bearings, an oil-cup for the upper bearing, a centrifugally-operated oiling device secured to the rotating member beneath the lower bearing and arranged to receive the oil flowing therefrom, and a transfer-pipe leading from said device out around the rotating member to the upper bearing.

In witness whereof I have hereunto set my hand this 21st day of January, 1901.

HENRY G. REIST.

Witnesses:
BENJAMIN B. HULL,
MARGARET E. WOOLLEY.